Patented Nov. 5, 1935

2,019,921

UNITED STATES PATENT OFFICE 2,019,921

PROCESS FOR STABILIZING CELLULOSE ESTERS

Carl J. Malm, Rochester, N. Y., and Charles L. Fletcher, Kingsport, Tenn., assignors to Eastman Kodak Company, Rochester, N. Y., a corporation of New York No Drawing. Application June 13, 1933, Serial No. 675,644

5 Claims. (Cl. 260—102)

The present invention relates to the stabilization of organic acid esters of cellulose in fibrous form by treating them with acetic, propionic or butyric acid and a non-solvent at an elevated temperature.

It is quite generally recognized that the instability and liability to deterioration of cellulose esters is due to the presence of sulfuric acid therein. It is well known that cellulose esters as prepared commercially have been subject to decomposition and instability as recognized for instance in Worden's "Technology of Cellulose Esters" (1916) volume VIII, pages 2919-20 in which tests to determine the stability of the cellulose acetates are disclosed. It is disclosed therein that the "stability factor" of a carefully prepared cellulose acetate should not exceed 5. This stability factor is determined by ascertaining the amount of apparent acetic acid in grams liberated from 100 grams of the ester when it is subjected to a temperature of 125° C. for 3 hours. A current difficulty in cellulose acetate manufacture has been the production of a cellulose acetate, which will have sufficient stability for use in the fine arts such as in the production of photographic film.

Other tests than those disclosed in Worden have also been evolved for determining the stability of cellulose esters. For example the stability of an ester may be determined by applying a fairly severe heat (such as 180° C.) to the ester and observing the time necessary for charring to occur. Obviously the stability of the ester is directly proportional to the time over which the ester resists charring. If the ester is of a stable nature it will resist charring at 180° C. for several hours but in the case of an unstable cellulose ester containing an appreciable amount of combined sulfuric acid, the time in which charring will occur will be merely a matter of minutes.

One method of stabilizing cellulose esters has been proposed in which the combined sulfuric acid in the ester is replaced by acetyl groups, by dissolving the cellulose ester in acetic acid and allowing it to stand for several hours in this solution. In the case of dope esterification to produce a cellulose ester this proposed treatment can be carried out before the ester is precipitated by adding sufficient quantities of water to change any acetic anhydride which might remain in the esterification mixture to the corresponding acid so that in the case of dope esterification processes that method might be satisfactory. However if the cellulose ester has been produced according to a fibrous esterification process it becomes necessary in this proposed stabilization method to dissolve the fibrous cellulose ester and then reprecipitate it from the solution after the stabilization treatment. Processes are known in which the viscosity characteristics of cellulose esters are reduced by dissolving them in fatty acids, however in those processes it is necessary that the ester go into solution in the fatty acid.

One object of the present invention is to provide a recess for stabilizing organic esters of cellulose which is more economical and yet just as efficient as former methods in which it was necessary that the ester go into solution. Another object of our invention is to provide a method of stabilizing a cellulose ester in suspension, which method is especially adapted to stabilizing cellulose esters produced by fibrous esterification processes. Other objects will hereinafter appear.

We have found that when a cellulose ester is treated according to the process of the present invention a product results which is extremely stable to the action of heat and which exhibits a negligible amount of deterioration or decomposition according to any of the stability tests referred to above. We have found that an organic acid ester of cellulose may be treated for a time in a bath comprising acetic, propionic and/or butyric acid and an organic non-solvent and the ester which previously may have exhibited a poor and unsatisfactory stability will resist the application of a severe temperature for a comparatively long period of time thus showing greatly improved stability of that ester. We have found that a cellulose ester may be stabilized by means of acetic or propionic acid without the necessity of dissolving the ester so that in the case of an ester produced by a fibrous esterification process the dissolving and precipitating thereof is unnecessary.

Our process is applicable to cellulose esters, the instability of which is due to the presence of combined sulfuric acid. Sulfuric acid is the catalyst most commonly employed in the esterification of cellulose and the product formed in such an esterification process will contain some combined sulfuric acid. It is the presence of this combined sulfuric acid in the product formed that detrimentally affects the stability of that product.

In the dope esterification of cellulose the ester formed is usually subjected to hydrolysis while still in the reaction mixture. In this hydrolysis step as a rule, most of the combined sulfuric acid is removed. Although our process may be employed to treat hydrolyzed cellulose esters, as a rule this type of ester is sufficiently stable for all practical purposes. With hydrolyzed esters therefore, our stabilizing process may be employed but such application is not essential.

In the fibrous esterification of cellulose, especially when the preparation of the mixed esters is contemplated, it is often desirable to eliminate the hydrolysis step entirely as the fully esterified product formed already has the desired solubilities and also a higher moisture resistance than the unhydrolyzed product. When this hydrolysis step is eliminated the removal of the combined sulfuric acid which may be present in the ester is unprovided for and the resulting product is unstable to heat.

Our invention may be performed by treating an organic acid ester of cellulose in undissolved form with a bath substantially comprising acetic, propionic and/or butyric acid and an organic non-solvent. The esters which may be stabilized by our invention may be either the simple fatty acid esters such as cellulose acetate, cellulose propionate or cellulose butyrate or the mixed fatty acid esters such as cellulose acetate propionate, cellulose acetate butyrate, cellulose acetate stearate etc. The esters stabilized by our invention may be either those prepared by dope esterification processes or those in which the cellulose ester retains the fibrous form of the original material by the addition to the esterification bath of a non-solvent such as carbon tetrachloride, benzene or a higher aliphatic ether having a boiling point above 80° C. The use of the latter group of nonsolvents has been disclosed and claimed in application Serial No. 590,509 of C. J. Malm and C. L. Fletcher, filed Feb. 2, 1932. The present invention is eminently suitable for combining with such fibrous processes as the fibrous esterification bath may be readily converted to a stabilization bath in accordance with the present invention. For example at the completion of a fibrous esterification process the acid anhydride may be converted to acid by adding the necessary amount of water to the esterification mixture. The cellulose ester present is then treated with the resulting mixture which consists of acetic acid (and/or propionic and/or butyric acid as the case may be) non-solvent and the catalyst for about 10 hours at approximately 120° F. resulting in a completely stable product.

The following examples illustrate processes embodying the application of our invention:

Example I 20 lbs. of cotton linters were treated with 40 lbs. of acetic acid for 3 hours at 150° F. whereupon the mixture was cooled to 70° F. and a mixture of 60 lbs. of 85% acetic anhydride, 50 lbs. of xylene, 50 lbs. of a saturated aliphatic hydrocarbon having a boiling range of 150°–200° C. and 360 c. c. of a mixture of 1 part of sulfuric acid and 3 parts of phosphoric acid was added. The use of the saturated liquid aliphatic hydrocarbons boiling above 150° C. as non-solvents in fibrous esterification baths is the invention of L. M. Minsk, W. O. Kenyon and H. LeB. Gray and is disclosed and claimed in their application Serial No. 671,900, filed May 19, 1933. The employment of an aromatic hydrocarbon in conjunction with a saturated aliphatic hydrocarbon as a non-solvent in a fibrous esterification bath is the invention of E. C. Yackel and W. O. Kenyon and is disclosed and claimed in their application Serial No. 671,899, filed May 19, 1933.

The reaction mixture was maintained at 70°–120° F. until a sample of the fibers showed good solubility in chloroform-alcohol (9:1). This sample was found to char in a few minutes when subjected to a temperature of 180° C. A mixture of 2 lbs. of water and 4 lbs. of acetic acid was added to the reaction mixture and the whole was maintained at approximately 120° F. for about 12 hours. A sample of the fibers was then washed and dried and was subjected to a temperature of 180° F. for several hours without any noticeable discoloration occurring.

Example II 100 lbs. of cotton linters were treated with 160 lbs. of propionic acid and 40 lbs. of acetic acid for three hours at 150° F. The mixture was then cooled to 70° F. and a mixture of 300 lbs. of 85% acetic anhydride 250 lbs. of xylene, 250 lbs. of Stoddard solvent (a saturated aliphatic hydrocarbon having a boiling range of 150°–200° C.) and 6 lbs. of a mixture of 1 part of sulfuric acid and 3 parts of phosphoric acid was added to the mass. The whole was maintained at a temperature of 70°–120° F. until a sample of the fibers showed good solubility in a mixture comprising 95% ethylene chloride and 5% methyl alcohol. A sample of the fibers was analyzed and was found to contain 1% of combined sulfuric acid. A sample was subjected to a temperature of 180° C. and it charred within a few minutes. A mixture of 10 lbs. of water and 20 lbs. of acetic acid was added to the reaction mixture which was then maintained at 120° F. for 12 hours. A sample of the fibers was washed and dried and upon analysis it was found to contain only a trace of sulfuric acid. A sample was subjected to a temperature of 180° F. for 8 hours without any evidence of discoloration being apparent.

Although a temperature around 120° F. is preferred for the carrying out of the present invention, the stabilization in accordance with the present invention may be satisfactorily carried out within approximately the range of 100–150° F. Below 100° the stabilization takes place so slowly that the process loses its commercial value, while at temperatures above 150° F. altho stabilization occurs, the sulfuric acid present exerts a pronounced degrading action on the cellulose unit. 120° F. has been found desirable in most cases however due to the fact that that temperature is so low that the organic non-solvent will not be driven off to any appreciable extent and yet the stabilization of the ester is accomplished in a comparatively short period of time. If higher temperatures are employed which would volatilize the non-solvent employed it would of course be necessary to carry out the stabilization in an enclosed vessel. If pressure in the vessel should be objectionable, it may be fitted with a reflux condenser however as a general rule the elevated pressure aids the stabilization process.

In the case of extremely volatile non-solvents such as ethyl ether it is preferred that the stabilization be carried out in a closed vessel even though a temperature of 120° F. is employed. The temperature of course can be even less than 120° F. and avoid volatilization of the low boiling non-solvent but such a low temperature stabilization would be slow and relatively ineffective.

We claim as our invention:

1. The process of stabilizing an organic acid ester of cellulose which comprises treating it at a temperature of 100°–150° F. in a bath essentially consisting of a lower fatty acid having 2-4 carbon atoms per molecule and a liquid aliphatic hydrocarbon having a boiling range of 150–200° C.

2. The process of stabilizing an organic acid ester of cellulose which comprises treating it at a temperature of 100°–150° F. in a bath essentially consisting of acetic acid and a petroleum distillate having a boiling range of 150°–200° C.

3. The process of stabilizing an organic acid ester of cellulose which comprises treating it at a temperature of 100–150° F. in a bath essentially consisting of a lower fatty acid having 2-4 carbon atoms per molecule and a petroleum distillate having a boiling range of 150°–200° C.

4. The process of stabilizing an organic acid ester of cellulose which comprises treating it at a temperature of approximately 120° F. in a bath essentially consisting of a lower fatty acid having 2-4 carbon atoms per molecule and a petroleum distillate having a boiling range of 150°–200° C.

5. The process of stabilizing an organic acid ester of cellulose which comprises treating it at a temperature of 100°–150° F. in a bath essentially consisting of propionic acid and a petroleum distillate having a boiling range of 150°–200° C.

CARL J. MALM.
CHARLES L. FLETCHER.